(12) United States Patent
Learmonth et al.

(10) Patent No.: US 7,214,089 B1
(45) Date of Patent: May 8, 2007

(54) UNIVERSAL SERIAL BUS ON-THE-GO APPARATUS

(75) Inventors: Tom Learmonth, Santa Ana, CA (US); Gary Kung, Santa Ana, CA (US)

(73) Assignee: I/O Interconnect Inc., Santa Ana, CA (US)

( * ) Notice: Subject to any disclaimer, the term of this patent is extended or adjusted under 35 U.S.C. 154(b) by 0 days.

(21) Appl. No.: 11/331,135

(22) Filed: Jan. 13, 2006

(51) Int. Cl.
*H01R 11/20* (2006.01)

(52) U.S. Cl. ...................... 439/441; 710/305

(58) Field of Classification Search ........ 439/607–610, 439/188, 441; 711/167, 105, 144; 713/501; 710/305
See application file for complete search history.

(56) References Cited

U.S. PATENT DOCUMENTS

| 6,678,811 B2 * | 1/2004 | Rentschler et al. ......... 711/167 |
| 2005/0182883 A1 * | 8/2005 | Overtoom .................. 710/305 |

* cited by examiner

Primary Examiner—J. F. Duverne
(74) Attorney, Agent, or Firm—Troxell Law Office, PLLC

(57) ABSTRACT

The present invention relates to a Universal Serial Bus On-The-Go apparatus, which comprises: a USB OTG controller; at least one port switching device, coupled to said USB OTG controller for switching a host role or a slave role connected to it, respectively; a first receptacle, coupled to said port switching device for connecting to a first USB device; a second receptacle, coupled to said switching device for connecting to a second USB device; and a state machine logic, coupled to said USB OTG controller for selectively enabling said port switching device by a predetermined priority and sensing plug-in activity to said first receptacle or second receptacle.

9 Claims, 4 Drawing Sheets

UNIVERSAL SERIAL BUS ON-THE-GO APPARATUS

REARGROUND OF THE INVENTION

1. Field of the Invention

The present invention relates to a Universal Serial Bus On-The-Go (OTG) apparatus, more particularly, it relates to a USB OTG apparatus which could selectively enable a port switching device by a pre-determined priority and sensing plug-in activity to the first receptacle port or second receptacle port.

2. Description of the Related Art

The Universal Serial Bus (USB) standard defines a host/slave relationship where the PC is the host, and a device that plugs into it is a slave (peripheral).

However, users of information technology products rely on mobile, battery-operated devices such as portable hard disk drives, PDAs, cellular smart-phones and digital cameras, which frequently have the need to transfer data between themselves and other devices. The users sometimes want to connect these devices directly to each other, a use not supported by USB.

In response to this limitation, a supplement has been added to the USB 2.0 specification, called USB On-The-Go (OTG), by the USB organization. OTG allows users to transfer data between devices by directly connecting them together, without the need for a PC Host. OTG addresses mobile connectivity by defining how two devices can connect directly without the need for a computer host. USB OTG allows the user to plug two devices together to establish a direct link. The devices themselves take care of the host/peripheral negotiation without any input from the user; the aim being to make the experience as simple as possible for the average user.

USB OTG defines two types of configurations: A-devices (devices that have a Standard-A or Mini-A plug inserted), these are hosts by default when connected, and B-devices (devices that have a Standard-B or Mini-B plug inserted), these are slaves by default when connected.

OTG-devices (formerly known as dual-role-devices) can be either an A-device or B-device, giving it the potential to be either host or slave. The roles are negotiated between the devices. A new connector, called a mini-AB has been defined which has an extra contact for detection of host/slave status. This requires devices to have cables with mini-A and/or mini-B plugs, but existing devices, and those expected to connect to a traditional USB Host, do not have these fitted.

Cables and adapters have to be used, which are fitted with mini-A and/or mini-B connectors. This sets the starting point for the negotiation of the connection handshake. This solution can work for every OTG connection situation, however for storage devices which take data from devices with full size A plugs and connects to PC's with full size B plugs, its not ideal—two additional adapters are required to enable the connections to be made. In addition, users who want to establish a connection may not be confident to know what items are needed to make the connections, or indeed if the devices can be connected at all.

There is therefore a need for a new and improved strategy and technique of a structure of a Universal Serial Bus On-The-Go apparatus for overcoming these deficiencies and the present invention overcomes these deficiencies in a new and novel fashion.

SUMMARY OF THE INVENTION

According to one aspect of the present invention, the present invention provides a Universal Serial Bus On-The-Go apparatus, which provides full size A (host, port A) and full size B (slave, port B) receptacles, for easy connection of existing devices to an OTG dual role device.

According to another aspect of the present invention, the present invention provides a Universal Serial Bus On-The-Go apparatus, which could sense the connection of a device on the A and B receptacles, and by their physical A or B plug are self-defined as host or slave.

For reaching the aforesaid objects, wherein, the Universal Serial Bus On-The-Go apparatus, which mainly comprises: a USB OTG controller; at least one port switching device, coupled to said USB OTG controller for switching a host role or a slave role connected to it, respectively; a first receptacle, coupled to said port switching device for connecting to a first USB device; a second receptacle, coupled to said switching device for connecting to a second USB device; and a state machine logic, coupled to said USB OTG controller for selectively enabling said port switching device by a pre-determined priority and sensing plug-in activity to said first receptacle or second receptacle.

BRIEF DESCRIPTION OF THE DRAWING PORTIONS

DETAILED DESCRIPTION OF THE PREFERRED EMBODIMENT

Figure 1:
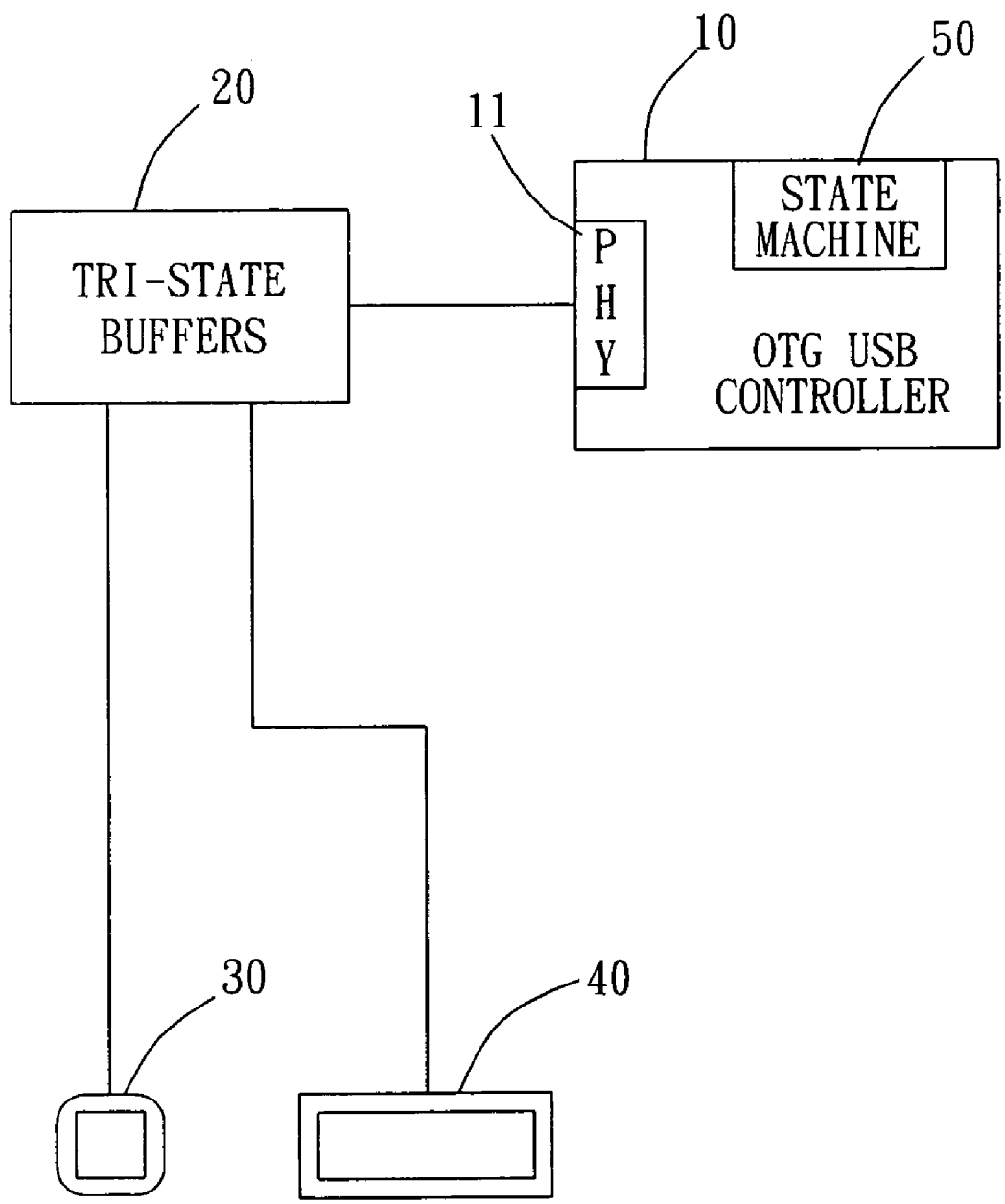
FIG. 1 shows a block diagram of the Universal Serial Bus (USB) On-The-Go (OTG) apparatus according to one embodiment of the present invention.

Referring to FIG. 1, which shows a block diagram of the Universal Serial Bus (USB) On-The-Go (OTG) apparatus according to one embodiment of the present invention. As shown in the FIG. 1, the Universal Serial Bus (USB) On-The-Go (OTG) apparatus of the present invention mainly comprises: a USB OTG controller 10; at least one port switching device 20; a first receptacle 30; a second receptacle 40 and a state machine logic 50.

Wherein, the USB OTG controller 10 has the On-The-Go (OTG) function described above and allows users to transfer data between USB devices (such as a USB storage device or digital camera) by directly connecting them together, without the need for a PC host; additionally, the USB OTG controller 10 generally has a firmware (not shown) for handling the function. Furthermore the USB OTG controller 10 further comprises a physical interface (PHY) 11 for coupling to the port switching devices 20.

The port switching device 20 is coupled to the USB OTG controller 10 for switching a host role or a slave role connected to it, respectively; wherein the port switching device 20 is implemented by tri-state buffers, preferably.

The first receptacle 30 is coupled to the port switching device 20 for connecting to a first USB device (not shown), such as a PC, USB Host, connected by a standard cable comprising USB 'A' to USB 'B' plugs, wherein, the first USB device 30 is for example but not limited to a full size 'B' receptacle and device plug-in therein will be recognized as a host.

The second receptacle 40 is also coupled to the port switching device 20 for connecting to a second USB device (not shown), such as a USB storage device or digital camera etc., wherein, the second receptacle 40 is for example but not limited to a full size 'A' receptacle and device plug-in therein will be recognized as a slave.

The state machine logic 50 is coupled to the USB OTG controller 10 for selectively enabling the port switching device 20 by a pre-determined priority and sensing plug-in activity to the first receptacle 30 or second receptacle 40. Wherein the state machine logic 50 is for example but not limited to be implemented as a separate controller, discrete logics or part of the firmware (not shown) of the USB OTG controller 10. The pre-determined priority of the state machine logic 50 determines the first receptacle 30 having the higher priority and the second receptacle 40 having the lower priority.

When the Universal Serial Bus (USB) On-The-Go (OTG) apparatus of the present invention is connected completely, one port (such as first receptacle 30) is given priority over the other (such as second receptacle 40). Priority will depend upon the device's function, for example a portable data storage device (not shown) may set first receptacle 30 priority over second receptacle 40. While attached a device (not shown) via the second receptacle 40 to a Camera USB slave (not shown), the device will behave as a host. However if data is to be transferred to a PC host (not shown) for example, the PC would be plugged in to the first receptacle 30 and the port switching device 20 would switch to connect the first receptacle 30. Once the data had been transferred, the PC would be disconnected and the port switching device 20 would revert to being a host connected to the Camera USB slave.

Figure 2:
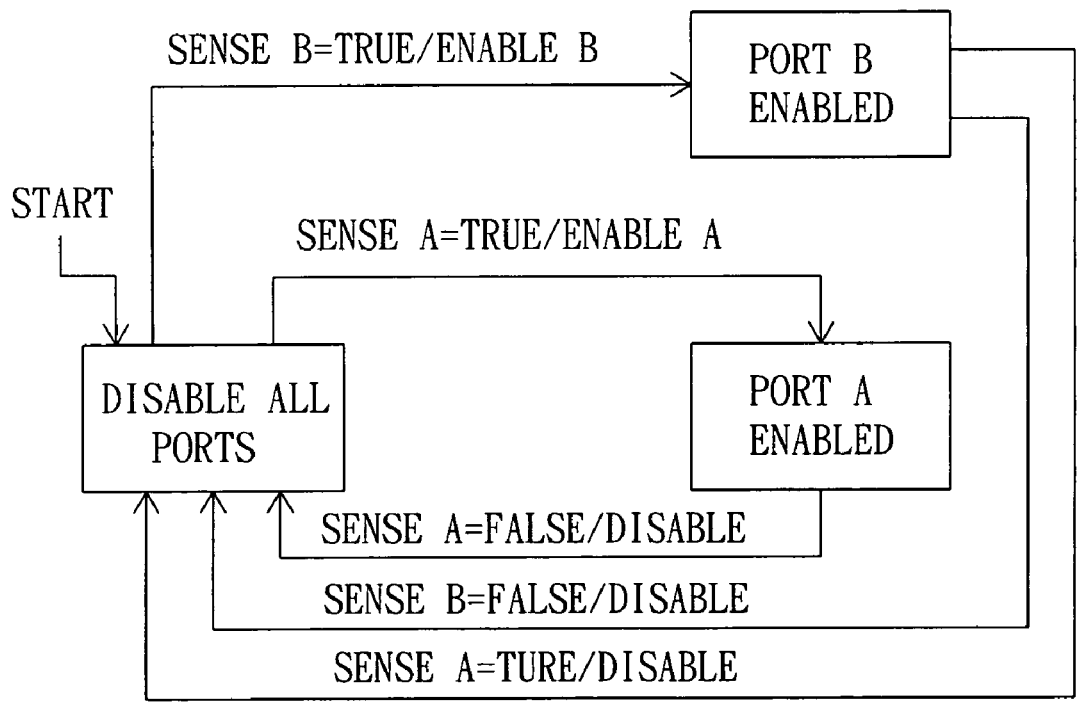
FIG. 2 shows the state machine logic used to select between the A or B USB ports according to one embodiment of the present invention.

Referring to FIG. 2, it shows the state machine logic used to select between the A or B USB ports according to one embodiment of the present invention. As shown in the FIG., the state machine logic 50 will selectively enable the port switching device 20 by a pre-determined priority and sensing plug-in activity to the first receptacle 30 or second receptacle 40. The state machine logic 50 will first sense the first receptacle 30 and enable the first receptacle 30 and disable the second receptacle 40 if there is a USB device plug-in therein; and then, the state machine logic 50 will sense the second receptacle 40 and enable the second receptacle 40 if there is a USB device being plug-in therein. That is, in one preferred embodiment of the present invention, the first receptacle 30 has priority over the second receptacle 40.

Figure 3:
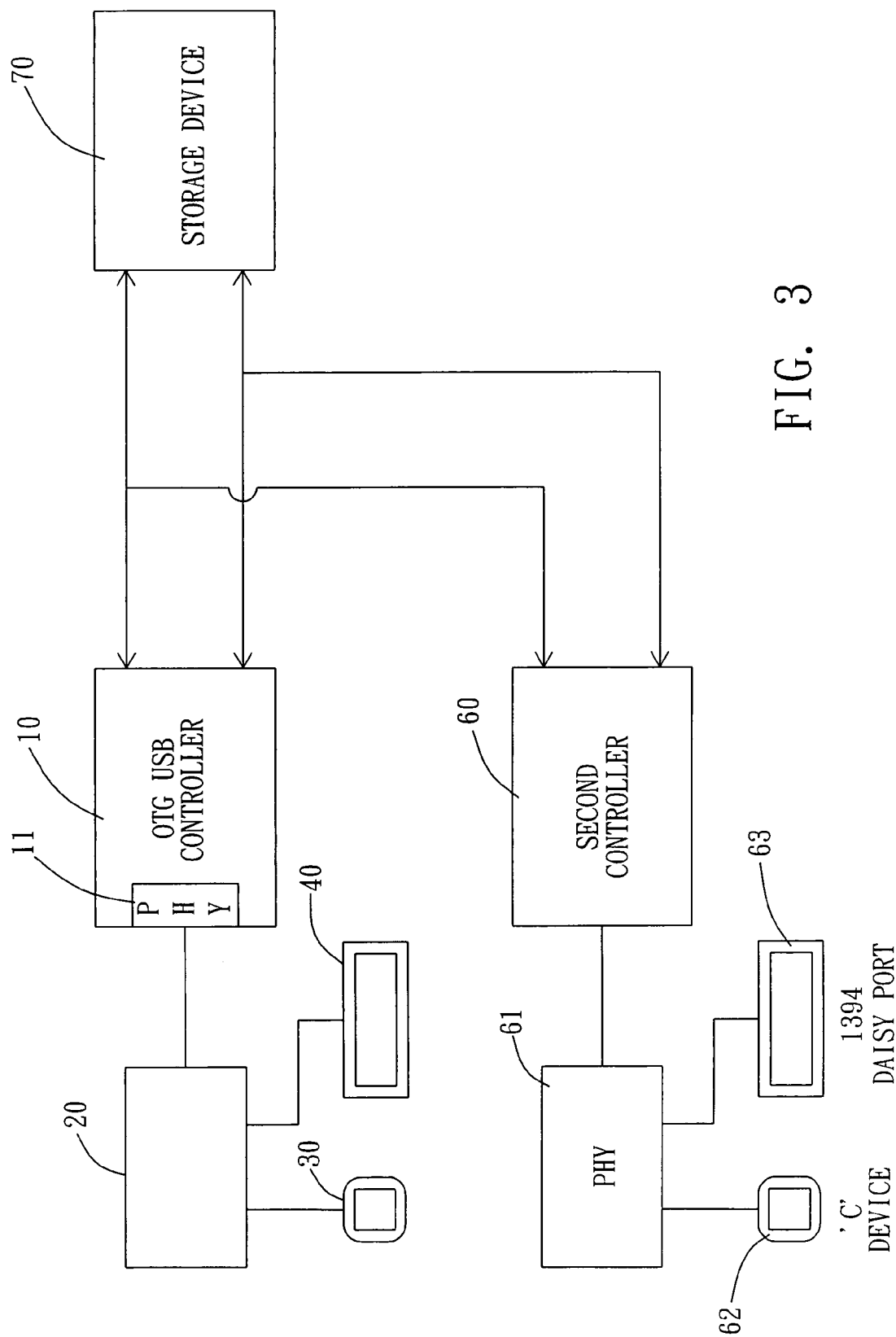
FIG. 3 shows a block diagram view of a second controller interfacing with the USB OTG controller according to another embodiment of the present invention.

Referring to FIG. 3, it shows a block diagram view of a second controller interfacing with the USB OTG controller according to another embodiment of the present invention. As shown in the FIG., the USB OTG controller 10 further interfaces to an Integrated Drive Electronics (IDE) Bus which is shared with a second controller 60 and connected to a storage device 70; the USB OTG controller 10 and second controller 60 are selectively enabled to the IDE Bus, respectively, to access the storage device 70 by the state machine logic 50 by the pre-determined priority and sensing of plug-in activity to the first receptacle 30, second receptacle 40 and receptacle pertaining to the second controller 60. Wherein the second controller 60 is for example but not limited to an IEEE1394 controller and the second controller 60 further comprises a physical interface 61 and at least one receptacle 62, for coupling to an IEEE1394 peripheral device (not shown), wherein the receptacle 62 can be used to connected to an IEEE1394 peripheral device, while the receptacle 63 can be used to connected to the IEEE1394 peripheral devices by a daisy-chain way.

The pre-determined priority of the state machine logic 50 determines the first receptacle 30 having the highest priority, the second receptacle 40 having the middle priority, and the receptacle 62, coupled to the second controller 60 having the lowest priority.

Figure 4:
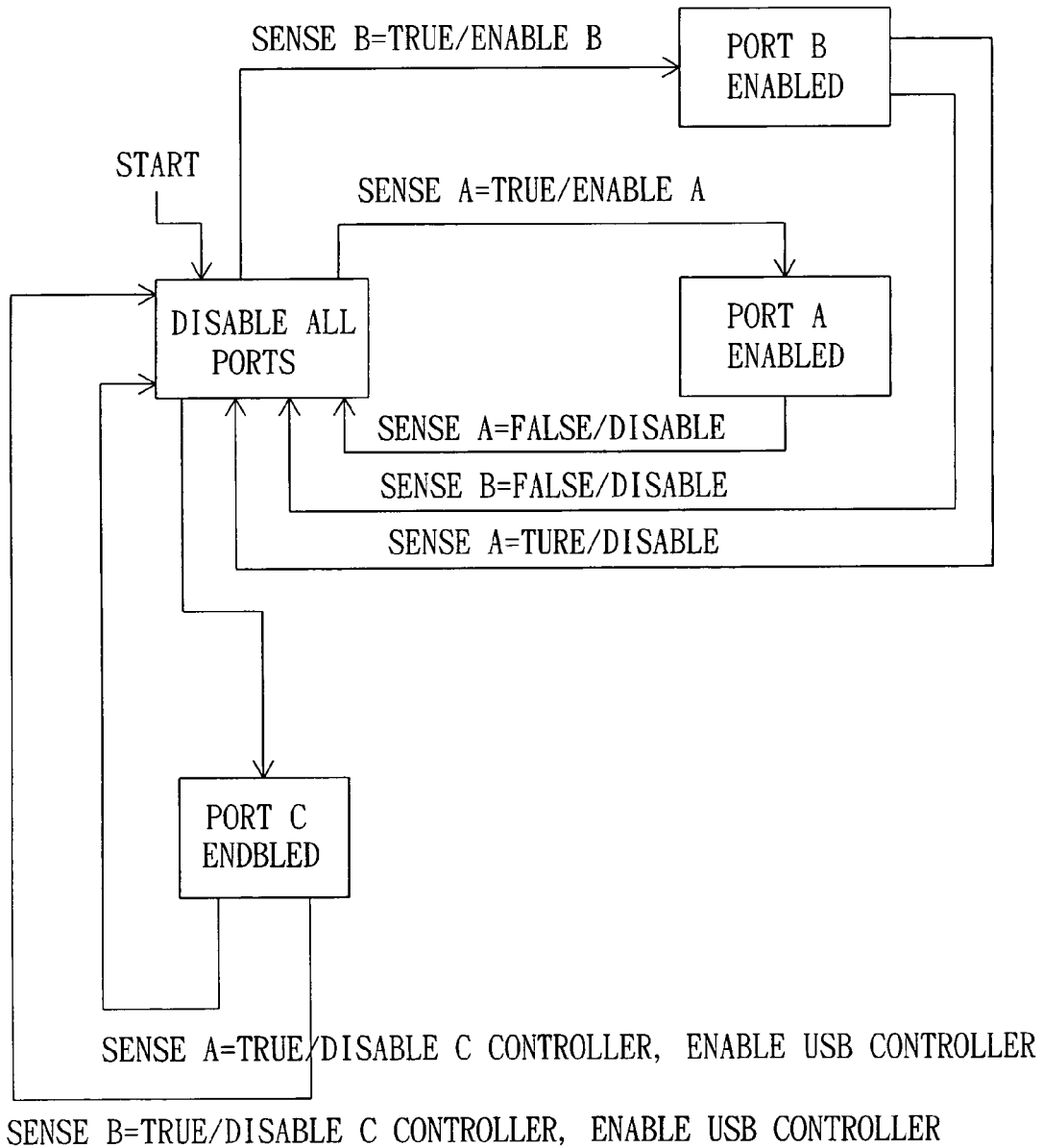
FIG. 4 shows the state machine can be extended to control one or more additional interfaces according to another embodiment of the present invention.

Referring to FIG. 4, it shows the state machine 50 can be extended to control one or more additional interfaces according to another embodiment of the present invention. As shown in the FIG., the state machine logic 50 will selectively enable the port switching device 20 by a pre-determined priority described above and sensing plug-in activity to the first receptacle 30, second receptacle 40 or receptacle 62. The state machine logic 50 will firstly sense the first receptacle 30 and enable the first receptacle 30 and disable the second receptacle 40 as well as the second controller 60 if there is a USB device being plugged therein; and then, the state machine logic 50 will secondly sense the second receptacle 40 and enable the second receptacle 40 if there is a USB device being plugged therein and the first receptacle 30 is disabled; finally, the state machine logic 50 will sense the receptacle 62 and enable the receptacle 62 if there is an IEEE 1394 device (not shown) being plugged therein and the first receptacle 30 and second receptacle 40 is disabled, respectively. That is, the first receptacle 30 is priority over the second receptacle 40, and the USB OTG controller 10 is priority over the second controller 60.

Therefore, the present invention provides a Universal Serial Bus On-The-Go apparatus, which provides full size A (host, port A) and B (slave, port B) receptacles, for easy connection of existing devices to an OTG dual role device; furthermore, the Universal Serial Bus On-The-Go apparatus of the present invention could sense the connection of a device on the A and B receptacles, and by their physical A or B plug are self-defined as slave or host; therefore, the Universal Serial Bus (USB) On-The-Go (OTG) apparatus of the present invention could overcome the aforesaid shortcomings. Furthermore the present invention could interface to an Integrated Drive Electronics (IDE) Bus which is shared with a second controller 60 and connected to a storage device 70, and those skilled in the art would readily recognize the state machine logic could be extended to control various alternative interface types.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A Universal Serial Bus On-The-Go apparatus, which comprises:
   a USB OTG controller;
   at least one port switching device, coupled to said USB OTG controller for switching a host role or a slave role connected to it, respectively;
   a first receptacle, coupled to said port switching device for connecting to a first USB device;
   a second receptacle, coupled to said switching device for connecting to a second USB device; and
   a state machine logic, coupled to said USB OTG controller for selectively enabling said port switching device by a pre-determined priority and sensing plug-in activity to said first receptacle or second receptacle,
wherein said state machine logic is implemented as part of a firmware of said USB OTG controller,
wherein said second controller further comprises a physical interface and at least one receptacle for coupling to an IEEE1394 peripheral device,
wherein said pre-determined priority of said state machine logic determines said first receptacle having the highest priority, said second receptacle having the middle priority, and said receptacle coupled to said second controller having the lowest priority.

2. The Universal Serial Bus On-The-Go apparatus as claimed in claim 1, wherein said USB OTG controller further comprises a physical interface for coupling to said port switching devices.

3. The Universal Serial Bus On-The-Go apparatus as claimed in claim 1, wherein said port switching devices are implemented by tri-state buffers.

4. The Universal Serial Bus On-The-Go apparatus as claimed in claim 1, wherein said state machine logic is implemented as a separate controller.

5. The Universal Serial Bus On-The-Go apparatus as claimed in claim 1, wherein said state machine logic is implemented as discrete logic.

6. The Universal Serial Bus On-The-Go apparatus as claimed in claim 1, wherein said second controller is an IEEE1394 controller.

7. A Universal Serial Bus On-The-Go apparatus, which comprises:
   a USB OTG controller;
   at least one port switching device, coupled to said USB OTG controller for switching a host role or a slave role connected to it, respectively;
   a first receptacle, coupled to said port switching device for connecting to a first USB device;
   a second receptacle, coupled to said switching device for connecting to a second USB device; and
   a state machine logic, coupled to said USB OTG controller for selectively enabling said port switching device by a pre-determined priority and sensing plug-in activity to said first receptacle or second receptacle,
   wherein said second receptacle is a full size 'A' receptacle and device plug-in therein will result in the OTG Controller becoming a host.

8. A Universal Serial Bus On-The-Go apparatus, which comprises:
   a USB OTG controller;
   at least one port switching device, coupled to said USB OTG controller for switching a host role or a slave role connected to it, respectively;
   a first receptacle, coupled to said port switching device for connecting to a first USB device;
   a second receptacle, coupled to said switching device for connecting to a second USB device; and
   a state machine logic, coupled to said USB OTG controller for selectively enabling said port switching device by a pre-determined priority and sensing plug-in activity to said first receptacle or second receptacle,
   wherein said first receptacle is a full size 'B' receptacle and device plug-in therein will result in the OTG Controller becoming a slave.

9. A Universal Serial Bus On-The-Go apparatus, which comprises:
   a USB OTG controller;
   at least one port switching device, coupled to said USB OTG controller for switching a host role or a slave role connected to it, respectively;
   a first receptacle, coupled to said port switching device for connecting to a first USB device;
   a second receptacle, coupled to said switching device for connecting to a second USB device; and
   a state machine logic, coupled to said USB OTG controller for selectively enabling said port switching device by a pre-determined priority and sensing plug-in activity to said first receptacle or second receptacle,
   wherein said USB OTG controller further interfaces to an Integrated Drive Electronics (IDE) Bus which is shared with a second controller, said USB OTG controller and second Controller being selectively enabled to said IDE Bus by said state machine logic by said pre-determined priority and sensing of plug-in activity to said first receptacle, second receptacle and receptacle pertaining to said second Controller.

* * * * *